United States Patent [19]

Sugiyama

[11] Patent Number: 4,982,285

[45] Date of Patent: Jan. 1, 1991

[54] APPARATUS FOR ADAPTIVE INTER-FRAME PREDICTIVE ENCODING OF VIDEO SIGNAL

[75] Inventor: Kenji Sugiyama, Noda, Japan

[73] Assignee: Victor Company of Japan, Ltd., Japan

[21] Appl. No.: 514,015

[22] Filed: Apr. 26, 1990

Related U.S. Application Data

[63] Continuation-in-part of Ser. No. 465,747, Jan. 16, 1990.

[30] Foreign Application Priority Data

Apr. 27, 1989 [JP] Japan .................................. 1-108419

[51] Int. Cl.[5] ............................................ H04N 7/12
[52] U.S. Cl. .................................... 358/136; 358/135
[58] Field of Search ................ 358/136, 135, 105, 133

[56] References Cited

U.S. PATENT DOCUMENTS 4,383,272 5/1983 Netravali et al. .................... 358/136
4,651,207 3/1987 Bergmann et al. .

OTHER PUBLICATIONS

"15/30 Mb/s Motion-Compensated Inter-Frame, Inter-Field and Intrafield Adaptive Prediction Coding" (Oct. 1985); Bulletin of the Society of Television Engineers (Japan); vol. 39, No. 10.

"Adaptive Hybrid Transform/Predictive Image coding" (Mar. 1987), Document D-1115 of the 70th Anniversary National Convention of the Society of Information and Communication Engineers (Japan).

Primary Examiner—Victor R. Kostak
Attorney, Agent, or Firm—Lowe, Price, LeBlanc, Becker & Shur

[57] ABSTRACT

An adaptive predictive encoding apparatus for encoding a video signal by utilizing correlation between frames in both the forward and reverse directions of the time axis. A prediction signal for use in deriving prediction error values to be encoded for a frame is selected by an adaptive prediction section, in units of blocks, from a plurality of mutually differently derived prediction signals, in accordance with the degree of correlation of the block with corresponding ones of a specific preceding independently encoded frame and a specific succeeding independently encoded frame.

5 Claims, 5 Drawing Sheets

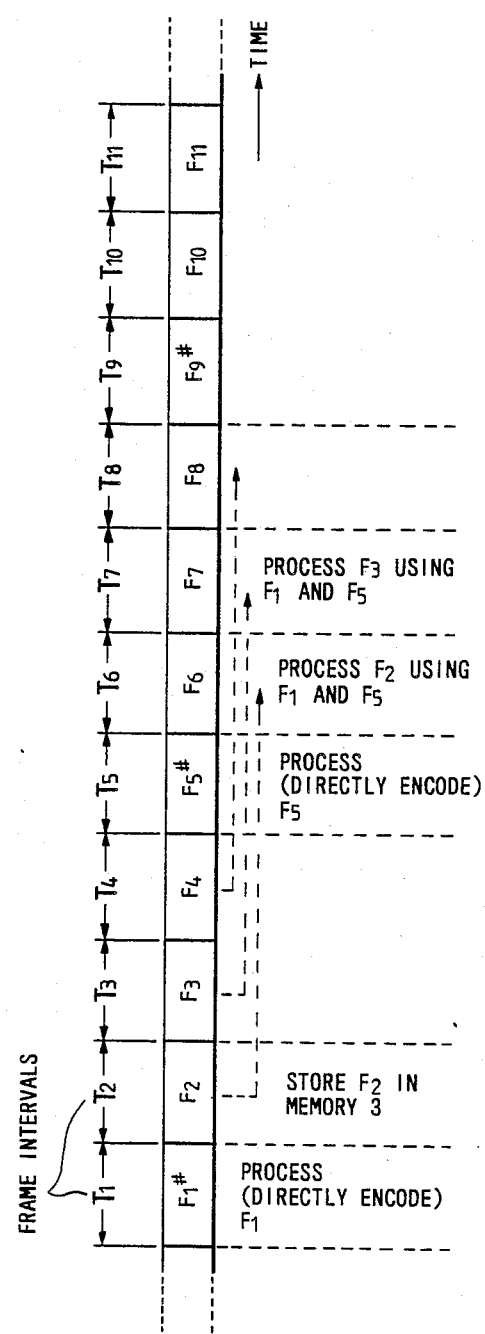

APPARATUS FOR ADAPTIVE INTER-FRAME PREDICTIVE ENCODING OF VIDEO SIGNAL

The present application is a continuation-in-part of a U.S. patent application (application number 465,747) with filing date Jan. 16, 1990.

BACKGROUND OF THE INVENTION

1. Field of Application

The present invention relates to an apparatus for encoding a video signal to produce an encoded signal for transmission or recording, with the encoded signal containing substantially lower amounts of data than the original video signal. In particular, the invention relates to an apparatus for inter-frame predictive encoding of a video signal, which is especially applicable to television conferencing systems or to moving-image video telephone systems.

2. Prior Art Technology

Various methods have been proposed in the prior art for converting a digital video signal to a signal containing smaller amounts of data, for example in order to reduce the bandwidth requirements of a communications link, or to reduce the storage capacity required for recording the video signal. Such methods are especially applicable to television conferencing or moving image video telephone systems, and utilize the fact that there is generally a high degree of correlation between successive frames of a video signal, and hence some degree of redundancy if all of the frames are transmitted. One basic method, described for example in U.S. Pat. No. 4,651,207, is to periodically omit one or more frames from being transmitted, and to derive information at the receiving end for interpolating the omitted frames (based on movement components in the transmitted frames). Such a method will provide satisfactory operation only so long as successive frames contain only relatively small amounts of change between one frame and the next. Another basic method known in the prior art is to periodically transmit (i.e. at fixed numbers of frame intervals) frames which are independently encoded, these being referred to in the following as independent frames, while, for each frame occurring between successive independent frames (these being referred to in the following as dependent frames), only amounts of difference between that frame and the preceding independent frame are encoded and transmitted, i.e. inter-frame predictive encoding is executed with the independent frames being used as reference frames. With a more practical form of that method, known as adaptive predictive encoding, such inter-frame predictive encoding is executed only when it is appropriate, that is to say only when there is no great difference between successive frames. When such a large difference is detected, then intra-frame encoding is executed. Example of such inter-frame encoding are described in the prior art for example in "15/30 Mb/s Motion-Compensated Inter-frame, Inter-field and Intrafield Adaptive Prediction Coding" (Oct. 1985) Bulletin of the Society of Television Engineers (Japan), Vol. 39, No 10. With that method, a television signal is encoded at a comparatively high data rate. Movement-compensation inter-frame prediction, intra-field prediction, and inter-field (i.e. intra-frame) prediction are utilized. Another example is described in "Adaptive Hybrid Transform/Predictive Image Coding" (March 1987) Document D-1115 of the 70th Anniversary National Convention of the Society of Information and Communication Engineers (Japan). With that method, switching is executed between inter-frame prediction of each dependent frame based on a preceding independent frame (which is the normal encoding method) and prediction that is based on adjacent blocks of pixels, prediction that is based on the image background, and no prediction (i.e. direct encoding of the original video signal). In the case of the "no-prediction" processing, orthogonal transform intra-frame encoding is executed, while in the case of background prediction, a special type of prediction is utilized which is suitable for a video signal to be used in television conferencing applications. Processing operation is switched between pixel blocks varying in size from $16 \times 16$ to $8 \times 8$ elements, as block units.

With such prior art adaptive predictive encoding methods, when a dependent frame is to be decoded (at the receiving end of the system, or after playback from a recording medium) the required data are obtained by cumulative superposition of past data relating to that frame, so that all of the related past data are required. It is necessary to use storage media for decoding which will enable random access operation, to obtain such data. This sets a limit to the maximum size of period of repetition of the independent frames (alternatively stated, the period of resetting of inter-frame predictive encoding operation), since if that period is excessively long then decoding storage requirements and operation will be difficult. However the shorter this resetting period is made, the greater will be the amounts of data contained in the encoded output signal and hence the lower will become the encoding efficiency. Typically, a period of 4 to 8 frames has been proposed for the prior art methods.

FIGS. 1A and 1B are simple conceptual diagrams to respectively illustrate the basic features of the aforementioned inter-frame predictive encoding methods and the method used in the aforementioned U.S. patent application by the assignee of the present invention. A succession of frames of a video signal are indicated as rectangles numbered 1, 2, . . . The shaded rectangles denote independent frames (i.e. independently encoded frames that are utilized as reference frames) which occur with a fixed period of four frame intervals, i.e. inter-frame predictive encoding is assumed to be reset once in every four frames. As indicated by the arrows, prediction operation is executed only along the forward direction of the time axis, so that difference values between a dependent frame and an independent frame (referred to in the following as prediction error values) are always obtained by using a preceding independent frame as a reference frame. Thus, independent frame No. 1 is used to derive prediction error values for each of frames 2, 3, and 4, which are encoded and transmitted as data representing these frames.

Such a prior art prediction method has a basic disadvantage. Specifically, only the correlation disadvantage. Specifically, only the correlation between successive frames of the video signal along the forward direction of the time axis is utilized. However in fact there is generally also strong correlation between successive frames in the opposite direction. The operation of the aforementioned related patent application by the assignee of the present invention utilizes that fact, as illustrated in FIG. 1B. Here, each frame occurring between two successive independent frames is subjected to inter-frame predictive encoding based on these two independent frames, as indicated by the arrows. For example, inter-frame predictive encoding of frame 2 is executed based on the independent frames 1 and 5. This is also true for frames 3 and 4. More precisely, a first prediction signal for frame 2 is derived based on frame 1 as a reference frame, and a second prediction signal for frame 2 is derived based on frame 5 as a reference frame. These two prediction signals are then multiplied by respective weighting factors and combined to obtain a final prediction error signal for frame 2, with greater weight being given to the first prediction signal (since frame 2 will have greater correlation with frame 1 than frame 5). Prediction signals for the other dependent frames are similarly derived, and differences between the prediction signal and a signal of a current frame are derived as prediction errors, then encoded and transmitted. Since in this case correlation between a preceding independent frame and a succeeding independent frame is utilized to obtain prediction signals for each dependent frame, a substantially greater degree of accuracy of prediction is attained than is possible with prior art methods in which only inter-frame correlation along the forward direction of the time axis is utilized.

Prior art methods of adaptive inter-frame predictive encoding can overcome the basic disadvantages described above referring to FIG. 1A, as will be described referring to FIGS. 2A, 2C. In FIGS. 2A and 2C (and also in FIGS. 2B, 2D, described hereinafter) respective numbered rectangles represent successive frames of a video signal. The frames indicated by the # symbol represent independently encoded frames. Of these, frames 1 and 5 are independent frames which occur with a fixed period of four frame intervals, i.e. inter-frame predictive encoding is reset once in every four successive frame intervals in these examples. The white rectangles denote frames whose image contents are mutually comparatively similar. The dark rectangles denote frames whose image contents are mutually comparatively similar, but are considerably different from the contents of the "white rectangle" frames. In FIG. 2A, frame 1 is an independent frame, and frame 2 is a dependent frame whose contents are encoded by inter-frame predictive encoding using frame 1 as a reference frame. There is a significant change (e.g. resulting from a "scene change", or resulting from a new portion of the background of the image being uncovered, for example due to the movement of a person or object within the scene that is being televised) in the video signal contents between frames 2 and 3 of FIG. 2A, so that it becomes impossible to execute inter-frame predictive encoding of frame 3 by using frame 2 as a reference frame. With a prior art method of adaptive inter-frame predictive encoding, this is detected, and results in frame 3 being independently encoded. Frame 3 is then used as a reference frame for inter-frame predictive encoding of frame 4.

Thus, each time that a scene change or other very considerable change occurs in the video signal, which does not coincide with the start of a (periodically occurring) independent frame, independent encoding of an additional frame must be executed instead of inter-frame predictive encoding, thereby resulting in a corresponding increase in the amount of encoded data which must be transmitted or recorded.

In the example of FIG. 2C, with a prior art method of adaptive inter-frame predictive encoding, it is assumed that only one frame (frame 3) is considerably different from the preceding and succeeding frames 1, 2 and 4, 5. This is detected, and frame 3 is then independently encoded instead of being subjected to inter-frame predictive encoding. However since frame 4 is now very different in content from frame 3, it is not possible to apply inter-frame predictive encoding to frame 4, so that it is also necessary to independently encode that frame also. Hence, each time that a single frame occurs which is markedly different from preceding and succeeding frames, it is necessary to independently encode an additional two frames, thereby increasing the amount of encoded data that must be transmitted. Such occurrences of isolated conspicuously different frames such as frame 3 in FIG. 2C can occur, for example, each time that a photographic flash is generated within the images that constitute the video signal.

These factors result in the actual amount of data that must be encoded and transmitted, in actual practice, being much larger than that for the ideal case in which only the periodically occuring independent frames (i.e. frames 1, 5, etc.) are independently encoded, and in which all other frames are transmitted after inter-frame predictive encoding based on these independent frames.

Another basic disadvantage of such a prior art method of adaptive inter-frame predictive encoding occurs when the encoded output data are to be recorded (e.g. by a video tape recorder) and subsequently played back and decoded to recover the original video signal. Specifically, when reverse playback operation of the recorded encoded data is to be executed, in which playback is executed with data being obtained in the reverse sequence along the time axis with respect to normal playback operation, it would be very difficult to apply such a prior art method, due to the fact that predictive encoding is always based upon a preceding frame. That is to say, prediction values are not contained the playback signal (in the case of reverse playback operation) in the correct sequence for use in decoding the playback data.

The aforementioned related patent application by the assignee of the present invention overcomes this problem of difficulty of use with reverse playback operation, since each dependent frame is predictively encoded based on both a preceding and a succeeding independent frame. However since the described apparatus is not of adaptive type, i.e. inter-frame predictive encoding is always executed for the dependent frames irrespective of whether or not large image content changes occur between successive ones of the dependent frames, it has the disadvantage of a deterioration of the resultant final display image in the event of frequent occurrences of scene changes, uncovering of the background, or other significant changes in the image content.

With a prior art method of adaptive inter-frame predictive encoding as described above, when scene changes occur, or movement of people or objects within the image conveyed by the video signal occurs, whereby new portions of the background of the image are uncovered, then large amounts of additional encoded data are generated, as a result of an increased number of frames being independently encoded rather than subjected to inter-frame predictive encoding. Various methods have been proposed for executing control such as to suppress the amount of such additional data. However this results in loss of image quality.

SUMMARY OF THE INVENTION

It is an objective of the present invention to overcome the disadvantages of the prior art as set out above, by providing an adaptive predictive encoding apparatus whereby an optimum prediction signal for use in deriving prediction error values for a dependent frame is selected, for each of successive blocks of the frame, from a plurality of prediction signals derived by respectively different combinations of signals obtained from a pair of preceding and succeeding independent claims. This selection is based upon the magnitude of the prediction error values that are produced, for the respective data values constituting a block, by these different prediction signals. If there is insufficient correlation between the block and the corresponding blocks of these preceding and succeeding frames, then the block is encoded independently of these other frames, by intra-frame encoding alone.

More specifically, the present invention provides an adaptive encoding apparatus for encoding an input video signal comprising a sequence of frames each comprising successive data values, the apparatus comprising:

encoder means for encoding successive blocks of a frame of the video signal, each of the blocks comprising a fixed-size array of the data values;

means for selecting one in every N of the frames to be transferred directly to the encoder means as an independent frame, to be encoded by intra-frame encoding, where N is a fixed integer of value greater than one; and adaptive prediction means for executing adaptive prediction processing, as a dependent frame, of each frame occurring between a preceding one and a succeeding one of the independent frames in the frame sequence, by deriving for the data values of each block of a dependent frame respective prediction error values based upon an optimum prediction signal selected from a plurality of prediction signals derived using a plurality of combinations of the preceding and succeeding independent frames.

The adaptive prediction means of such an adaptive predictive encoding apparatus preferably comprises:

means for deriving a first prediction signal based on a combination of data values of the preceding and succeeding independent frames, a second prediction signal derived only from the preceding independent frame, a third prediction signal derived only from the succeeding, and a non-prediction signal derived only from the dependent frame; and predictive mode selection means for selecting, for each of the blocks, one out of four prediction modes in which the first, second and third prediction signals and the non-prediction signal to are respectively used in deriving predictive error values for respective data values of the block, to be sent to the encoder means and encoded thereby, the selection being based upon judgement of the error values, the predictive mode selection means further supplying to the encoding means, to be encoded thereby, predictive mode data indicating predictive modes which have been selected for respective ones of the blocks.

BRIEF DESCRIPTION OF THE DRAWINGS

FIG. 5 is a timing diagram for assistance in describing the operation of the apparatus of FIG. 5.

DESCRIPTION OF PREFERRED EMBODIMENTS

Figure 2A:
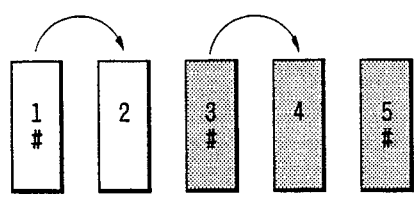
FIGS. 2A, 2C are conceptual diagrams for describing a prior art method of adaptive inter-frame predictive encoding.
Figure 2B:
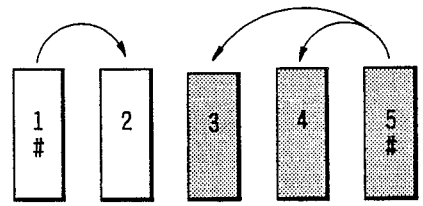
FIGS. 2B, 2D are for describing a method of adaptive inter-frame predictive encoding according to the present invention.
Figure 2C:
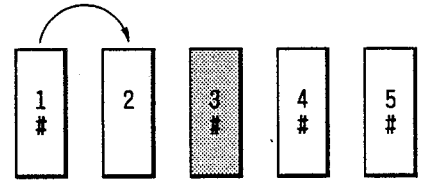
Figure 2D:
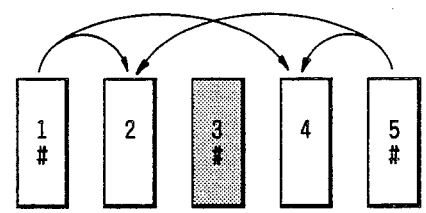

FIGS. 2B and 2D illustrate the manner in which the frame sequences of FIGS. 2A and 2C respectively (described hereinabove) are handled by the method of adaptive inter-frame predictive encoding of the present invention, as compared with a prior art method of adaptive inter-frame predictive encoding. In the case of FIG. 2B, in which there is a scene change between frames 2 and 3, so that the preceding independent frame 1 cannot be used for inter-frame predictive encoding of frames 3 and 4, use is made of the correlation between succeeding independent frame 5 and the dependent frames 3 and 4. That is to say, only the succeeding independent frame 5 is used for inter-frame predictive processing of the dependent frames 3 and 4. This makes it unnecessary to independently encode frame No. 3, as is required with a prior art method of adaptive inter-frame predictive encoding which uses only the forward direction of the time axis. Thus, the average amount of encoded data that are generated will be reduced, since it is no longer necessary to independently encode a dependent frame (or a large part of a dependent frame) each time that a scene change or other very substantial change in the contents of a frame occurs.

In the case of FIG. 2D, where only frame No. 3 is very different from the preceding and succeeding frames, it is necessary with a prior art method of adaptive inter-frame predictive encoding to independently encode both of frames 3 and 4, as described hereinabove. However with the present invention, use is made of the fact that frame 3 is an isolated occurrence, by using the succeeding independent frame No. 5 for inter-frame predictive encoding of frame No. 3. In this way, it becomes unnecessary to independently encode all of (or a large part of) a dependent frame which succeeds an isolated significantly different dependent frame, as is required for frame 4 in the case of a prior art method of adaptive inter-frame predictive encoding, as described above for FIG. 2C.

The basic operation of an adaptive predictive encoding apparatus according to the present invention is as follows. The encoder processes each frame of an input video signal in units of blocks (where each block will for example consist of an 8×8 array of pixels of the frame), and the apparatus determines for each block of a frame which of the following correlation conditions exists between that block and the correspondingly positioned blocks of the preceding independent frame and the succeeding independent frame:

(Option 1) Optimum prediction will be achieved by processing using a combination of the corresponding blocks (i.e. correspondingly positioned within the frame) of both the preceding and succeeding independent frames.

(Option 2) Optimum prediction will be achieved by processing using only the corresponding block of the preceding independent frame.

(Option 3) Optimum prediction will be achieved by processing using only the corresponding block of the succeeding independent frame.

(Option 4) Optimum operation will be achieved by directly encoding that block (only intra-frame encoding executed).

The decision as to which of the above four options is optimal is based upon a total of respective squared values of difference between each data value representing a pixel of the block and the corresponding data values of the corresponding blocks in the preceding and succeeding frames. Processing of the block is then executed, that is to say either a set of inter-frame prediction error values with respect to the pixels of the corresponding block of the preceding and/or succeeding independent frames, or the data values for the pixels of the block in question, slightly modified as described hereinafter, are then encoded for transmission or recording. In addition, prediction mode data which indicates which of the above four options has been selected for that block is encoded with the video data, and transmitted or recorded. At the receiving end, or upon playback of the recorded encoded data, decoding is executed, utilizing the prediction mode data to control the decoding operation.

Figure 3:
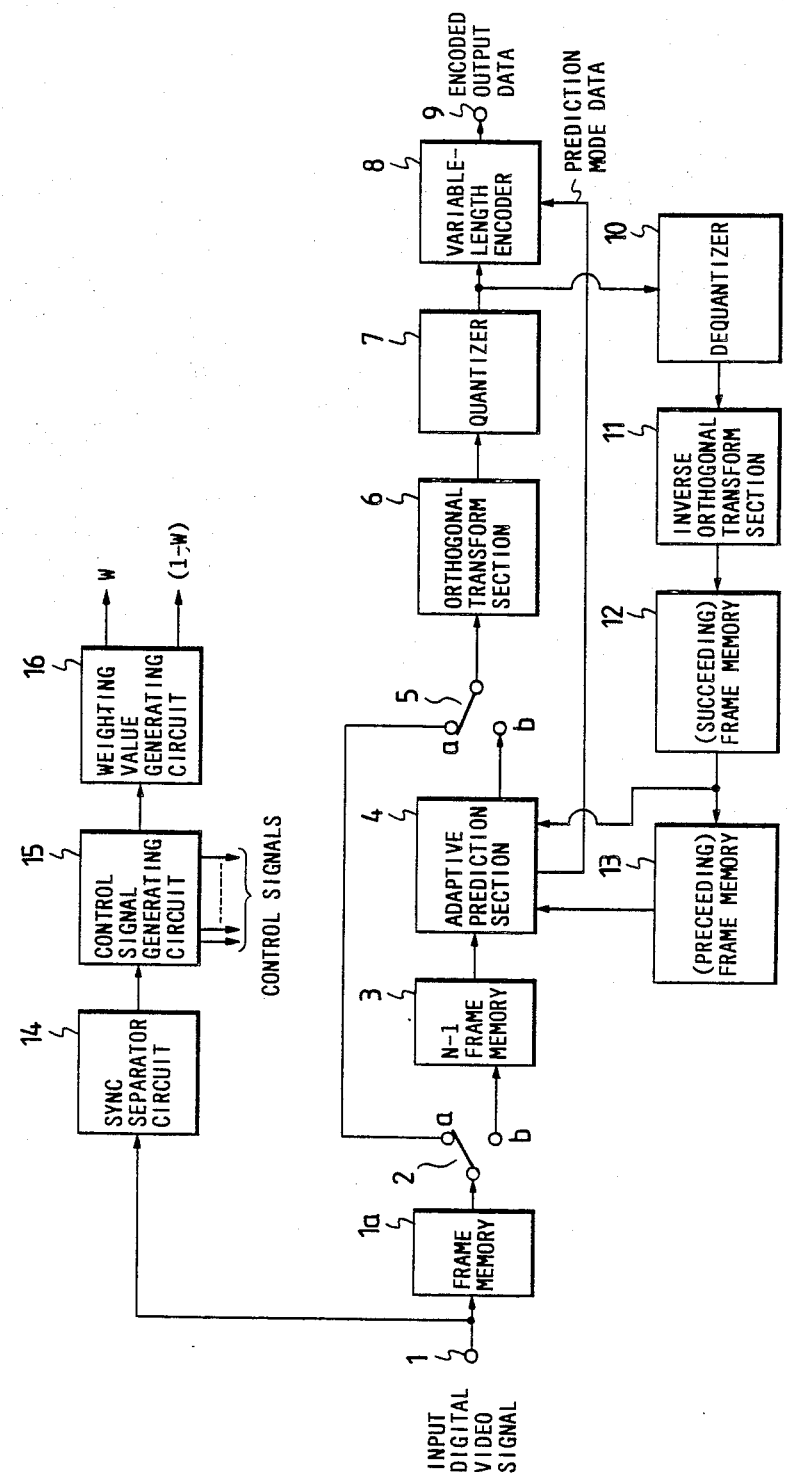
FIG. 3 is a general block diagram of an embodiment of an encoding apparatus for adaptive inter-frame predictive encoding according to the present invention.

FIG. 3 is a general block diagram of an embodiment of an inter-frame adaptive predictive encoding apparatus according to the present invention. A frame memory 1a receives a (moving picture) digital video signal from an input terminal 1 as successive data values, consisting of luminance (Y) values for respective pixels, as well as chrominance (R−Y) and (B−Y), i.e. color difference, values. Successive frames of the video signal are stored in the frame memory 1a. Successive blocks of a frame that is currently held in the frame memory 1a are read out in a predetermined sequence, each of the blocks consisting for example of an 8×8 element array of luminance (Y) or chrominance, i.e. color difference (B−Y) or (R−Y) values. Each block of luminance data values directly corresponds to a physical (display) size of 8×8 pixels. However in general each 8×8 block of chrominance values will correspond to a larger physical area than 8×8 pixels. For example as set out by the CCITT of the International Telecommunication Union, Document #339, Mar. 1988 document "Description of Ref. Model 5 (RM5)", in which a common source input format for coding of color television signals is specified, each 8×8 block of color difference values will correspond (in display size) to a 16×16 macro block of luminance values consisting of four 8×8 blocks.

It should be understood that the description of adaptive prediction operation given herein applies to both processing of luminance and color difference values.

The values of each block are successively read out in a predetermined sequence. The output data from the frame memory 1a is supplied to a movable contact of a changeover switch 2. The "a" fixed contact of the changeover switch 2 is connected to the "a" fixed contact of a changeover switch 5, while the "b" fixed contact of the changeover switch 2 is connected to the input of a (N−1) frame memory 3. The (N−1) frame memory 3 is a memory having a capacity for storing up to (N−1) successively inputted frames, where N is a fixed integer, and is used to produce a delay of N frame intervals, i.e. a frame which is written into that memory during one frame interval is subsequently read out from the memory in the fourth frame interval to occur thereafter. The output of the (N−1) frame memory 3 is supplied to an adaptive prediction section 4, while the output of the adaptive prediction section 4 is supplied to the "b" fixed contact of the changeover switch 5. The movable contact of the changeover switch 5 is connected to the input of a orthogonal transform section 6, whose output is supplied to a quantizer 7. The output from the quantizer 7 is supplied to an variable-length encoder section 8 and also to a dequantizer 10. The output from the variable-length encoder section 8 is applied to an output terminal 9. The output from the dequantizer 10 is supplied to an inverse orthogonal transform section 11, whose output is supplied to a (succeeding) frame memory 12. The output from the 12 is supplied to a (preceding) frame memory 13 and also to a second input of the adaptive prediction section 4. The output of the (preceding) frame memory 13 is applied to a third input of the adaptive prediction section 4. An output from the adaptive prediction section 4, consisting of the aforemenetion prediction mode data, is supplied to a second input of the variable-length encoder section 8.

A synchronizing signal separator circuit 4 receives the input video signal and separates the sync signal components thereof to derive synchronizing signals which are supplied to a control signal generating circuit 15. The control signal generating circuit 15 thereby generates variuous control and timing signals for controlling switching operation of the changeover switches 2 and 5, and memory read and write operations of the frame memory 1a, (N−1) frame memory 3, (succeeding) frame memory 12 and (preceding) frame memory 13.

A weighting value generating circuit 16 receives a timing signal from the control signal generating circuit 15, and generates successive pairs of weighting values W and (1−W) which vary in value on successive frames as described hereinafter. These pairs of weighting values are supplied to the adaptive prediction section 4.

The switching operation of the changeover switch 5 is linked to that of the changeover switch 2, and when both of these are set to the respective "a" terminals, the signal of an independent frame is directly inputted to the orthogonal transform section 6, to be directly transformed and encoded.

The output signal from the changeover switch 5 thus consists of successive data values of successive blocks of an independent frame, during each interval in which data values of an independent frame are being read out from the frame memory 1a, with switches 2 and 5 set to their "a" positions. When the switches are set to their "b" positions, then the output signal from the changeover switch 5 consists of either successive prediction error values for a block of a dependent frame, or data values (which may have been modified by intra-frame processing) of a block of a dependent frame.

In order to maximize the efficiency of encoding, the Y (luminance) and (R−Y), (B−Y) (chrominance) values of the output signal from the changeover switch 5 are converted by the orthogonal transform section 6 to coefficient component values by an orthogonal transform operation, such as the discrete cosine transform (DCT), in units of blocks. The resultant output signal from the orthogonal transform section 6 is then quantized using steps of appropriate size, by the quantizer 7. Since the distribution of the resultant quantized signal is close to zero amplitude, encoding efficiency is further increased by encoding the quantized signal by a variable-length encoding technique, such as Huffman encoding. In addition, the aforementioned prediction mode data values supplied from the adaptive prediction section 4 to the variable-length encoder section 8 are also encoded by the variable-length encoding technique. The resultant variable-length data are supplied to an output terminal 9, to be transmitted to a corresponding decoding apparatus, or to be recorded and subsequently played back and supplied to a corresponding decoding apparatus.

Figure 4:
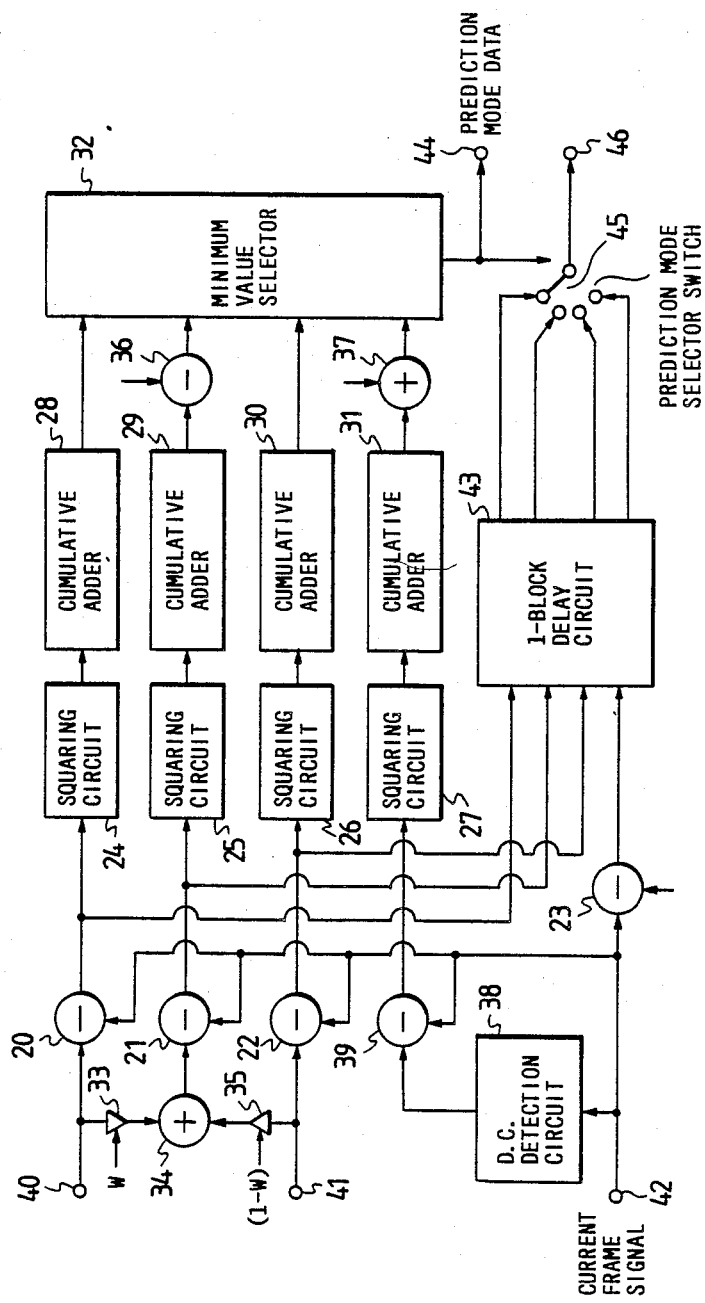
FIG. 4 is a block diagram of an adpative prediction section of the apparatus of FIG. 3.

FIG. 4 is a general block diagram of the adaptive prediction section 4 of FIG. 3. The data read out from the (preceding) frame memory 13 are applied, as a preceding frame signal, to an input terminal 40 and hence to one input of a subtractor 20. The output from the (succeeding) frame memory 12 is applied, as a succeeding frame signal, to an input terminal 40 and hence to one input of a subtractor 22. 33 denotes a coefficient multiplier which multiplies each data value from input terminal 40 by the aforementioned weighting value W and supplies the resultant values to one input of an adder 34. 35 denotes a coefficient multiplier which multiplies each data value from input terminal 40 by the aforementioned weighting value $(1-W)$ and supplies the resultant values to the other input of the adder 34. The output from the adder 34 is applied to one input of a prediction signal subtractor 21. The contents of the frame that is currently being read out from the $(N-1)$ frame memory 3 (that frame being referred to in the following as the current frame) is applied as a current frame signal to an input terminal 42 and hence to one input of a subtractor 23. The current frame signal is also supplied to the respective other inputs of the subtractor 20, prediction signal subtractor 21 and subtractor 22. A fixed data value is applied to the other input of the subtractor 23.

The value of the DC component of the signal of the current frame is derived by a DC level detection circuit 38, and applied to one input of a subtractor 39. The current frame signal is applied to the other input of the subtractor 39, to have the DC component subtracted therefrom. This subtraction of the DC component is necessary in order to prevent excessively high output values from being produced from a squaring circuit 27, described hereinafter.

The respective outputs from the subtractors 21, 20, and 22 (these outputs being referred to in the following as the first, second, and third prediction signals), and the output from subtractor 23 (referred to in the following as a non-prediction signal) are applied as to corresponding inputs of a delay section 43, which subjects each of these signals to a delay which is equal to the period of one block (i.e. corresponding to 64 pixels, in this example). The delayed outputs from the 1-block delay circuit 43 are applied to respective fixed contacts of a prediction mode selector switch 45, whose movable contact is coupled to an output terminal 46.

The first, second and third prediction signals from the subtractors 21, 20 and 22, and the non-prediction signal from subtractor 39 are also respectively applied to inputs of squaring circuits 25, 24, 26 and 27. Each of these thereby produces the square of each (prediction error) data value that is inputted thereto, and these squared error values produced from circuits 24 to 27 are respectively supplied to inputs of additive accumulator circuits 28 to 31, each of which functions to obtain the sum of the squared error values of respective pixels of one block at a time. That is to say, when the total of the squared error values for one block has been computed by one of these accumulator circuits, the result is outputted therefrom, the contents are reset to zero, and computation of the squared error value total for the next block begins.

The output from the cumulative adder 28 is supplied directly to a first input terminal of a minimum value selector circuit 32. The output from the cumulative adder 29 is supplied via a subtractor 36, in which a predetermined fixed compensation value is subtracted therefrom, to a second input terminal of the minimum value selector circuit 32. The output from the cumulative adder 30 is supplied directly to a third input terminal of the minimum value selector circuit 32. The output from the cumulative adder 31 is supplied via an adder 37, in which a predetermined fixed compensation value is added thereto, to a fourth input terminal of the minimum value selector circuit 32.

Figure 1A:
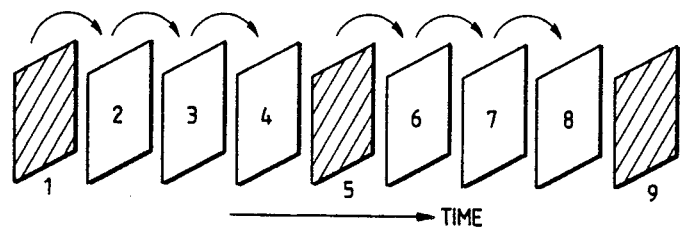
FIGS. 1A and 1B are conceptual diagrams for describing inter-frame predictive operation using one direction and both directions of the time axis, respectively.
Figure 1B:
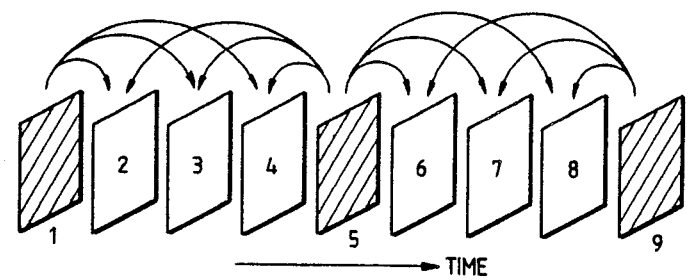

Each time that the respective accumulated total error-squared values for one block have been derived by the cumulative adder 28 to cumulative adder 31 respectively and supplied to the minimum value selector circuit 32, the minimum value selector circuit 32 judges which of these is lowest in value and produces an output data signal indicative of that value. That output data signal serves as prediction mode data, i.e. is used to determine which mode of operation will provide optimum encoding accuracy, to thereby determine which of Option 1 to Option 4 described hereinabove is applicable to the block for which judgement of the accumulated total error-squared values has been made. That prediction mode information is then applied to control the setting of the prediction mode selector switch 45, to determine which of the delayed outputs from the 1-block delay circuit 43 will be selected to be transferred to output terminal 46, and hence to the "b" terminal of the changeover switch 5 of FIG. 1.

More specifically, the setting of the prediction mode selector switch 45 is controlled by the prediction mode data output from the minimum value selector circuit 32 such that the delayed prediction error output from the prediction signal subtractor 21 is selected, if that output has resulted in the smallest value of accumulated squared error value for the block in question (representing the case of Option 1 above being selected). This will be referred to as mode 1. Similarly, the delayed output from the subtractor 20 will be selected by the prediction mode selector switch 45 for the case of Option 2 above being selected (this being referred to the following as mode 2), the delayed output from the subtractor 22 will be selected by the prediction mode selector switch 45 for the case of Option 3 above being selected (this being referred to in the following as mode 3), and the delayed output from the subtractor 23 will be selected by the prediction mode selector switch 45 for the case of Option 4 above being selected (this being the case in which no inter-frame prediction is executed for the block in question, and referred in the following as mode 4).

The values of the weighting values W and $(1-W)$ vary for successive ones of the dependent frames in a linear manner, i.e. Option 1 represents 2-dimensional linear prediction operation, with W being a maximum for the first dependent frame following an independent frame and reaching a minimum value for a dependent frame which immediately precedes an independent frame.

Specifically, the weighting value W is defined as:

$$W = (mc - mp)/N$$

[where $0 < W < 1$, mc denotes the number of the current frame in the sequence of frames, mp denotes the number of the preceding independent frame of that current frame].

The value X of a data value (corresponding to one pixel) of the output signal from the adder 34, that signal being referred to in the following as a prediction signal, is obtained as:

$$X = W \cdot Vmp + (1 - W) \cdot Vms$$

[where Vms is the corresponding value of the succeeding independent frame signal from input terminal 40 and Vmp is the corresponding value of the preceding independent frame signal from input terminal 41].

Each value X of the prediction signal produced from the adder 34 is subtracted from a corresponding value of the current frame signal, in the prediction signal subtractor 21, and the result is supplied as a preceding-/succeeding frame prediction error value to the squaring circuit 25.

Each value of the preceding frame signal is subtracted from a corresponding value of the current frame signal, in the subtractor 20, and the result is supplied as a preceding frame prediction error value to the squaring circuit 24.

Similarly, each value of the succeeding frame signal subtracted from a corresponding value of the current frame signal, in the subtractor 22, and the result is supplied as a succeeding frame prediction error value to the squaring circuit 26.

The fixed value that is subtracted from the current frame signal by the subtractor 23 can be established in various ways, for example as being equal to 50% of the maximum white level of the video signal, when a luminance (Y) value is being processed, and equal to zero when a color difference (B−Y) or (R−Y) value is being processed. Alternatively, the DC component of a spatially adjacent block within the same frame could be utilized instead of that fixed value. Whichever type of value is utilized, inter-frame prediction is not executed for a block, in the case of mode 4 being selected, and only intra-frame processing is executed for the block.

FIG. 5 is a simple timing diagram for illustrating the basic timing relationships of this embodiment. F1 to F11 denote 11 successive frames of the input video signal, with corresponding frame intervals (specifically, intervals in which the respective frames are read out from the frame memory 1a) designated as T1 to T11. Each independent frame is designated by a # symbol, i.e. frames F1, F5 and F9. It is assumed that one out of every 4 frames is an independent frame, i.e. that periodic resetting of inter-frame prediction operation occurs with a period of 4 frames. The timings of processing operations for frames F2 to F5 will be described.

(a) In frame interval T1

The successive blocks of independent frame F1 are transferred through the switches 2 and 5, to be directly encoded, then are processed in the dequantizer 10 and inverse orthogonal transform section 11 to recover the original frame data, and then are written into the (succeeding) frame memory 12.

(b) In frame intervals T2, T3 and T4

Frames F2, F3, and F4 are successively written into the (N−1) frame memory 3.

(c) In frame interval T5

The successive blocks of independent frame F5 are transferred through the switches 2 and 5, to be directly encoded, then are processed in the dequantizer 10 and inverse orthogonal transform section 11 to recover the original frame data, and then are written into the (succeeding) frame memory 12 to replace the previous contents of that memory, after writing the contents of the (succeeding) frame memory 12 into the (preceding) frame memory 13 to replace the previous contents thereof.

(d) Frame Interval T6

During T6, frame F6 is written into the frame memory 3, at the same time frame F2 is read out from memory 3, and corresponding prediction signals for frame F2 are outputted from the adaptive prediction section 4 and inputted to delay unit 43 together with the output from subtractor 23. At the end of T6, the prediction mode output signal from the minimum value selector 32 sets switch 45 to an appropriate selection position, based on the minimum accumulated error-squared value that is inputted to the minimum value selector 32. The mode output signal is also transferred to the encoder 8 to be encoded and outputted.

(e) Frame Interval T7

Frame F7 is written into the frame memory 3, at the same time, frame F3 is read out from memory 3, and processed in the same way as for frame F2, and the prediction mode data for frame F3 is sent to the encoder 8.

The selected prediction signal for frame F3 (or the output from subtractor 23) is transferred from switch 45 to the orthogonal transform section 6, to be processed, encoded and outputted.

It can be understood that the circuit of FIG. 4 serves to execute adaptive selection, on a block-by-block basis, of the optimum mode for encoding each block of each dependent frame of the video signal. That is to say, the variable-length encoder section 8 adaptively selects one of the following modes to be used in encoding each block of a dependent frame:

(a) Mode 1, in which 2-dimensional linear inter-frame prediction is executed. This is selected when there is sufficient (linearly weighted) correlation between the block and the corresponding blocks of the preceding and succeeding independent frames. This would be selected for a block in frame 2 of FIG. 2D, for example.

(b) Mode 2, in which inter-frame prediction is executed using only the preceding independent frame. This is selected when there is insufficient correlation with the corresponding block of the succeeding independent frame. This would be selected for a block of frame 2 in FIG. 2B, for example.

(c) Mode 3, in which inter-frame prediction is executed using only the succeeding independent frame. This is selected when there is insufficient correlation with the corresponding block of the preceding independent frame. This would be selected for a block of frame 3 or frame 4 in FIG. 2B, for example.

(d) Mode 4, in which inter-frame prediction is not executed. This is selected when there is insufficient correlation between the current block and the corresponding blocks of each of the preceding and succeeding frames. This would be selected, for example, for a block in frame 3 of FIG. 2D. It has been assumed, for simplicity of description, that this applies to all of the blocks of frame 3 of FIG. 2D, so that inter-frame prediction is not applied to any blocks of that frame.

Since the independent frame signal values that are used in deriving the prediction error values are obtained by recovering the original video signal by decoding operation (in the dequantizer 10 and inverse orthogonal transform section 11), in the same way that decoding is executed in a corresponding decoder apparatus (not shown in the drawings), the various quantization errors etc. that are present in the final decoded data will also be present in the data that are used in deriving the prediction error values. This ensures a greater accuracy of prediction than would be the case if the independent frames of the input video signal data were to be written directly into the memories 12 and then 13.

With this embodiment, evaluation for determining the prediction mode is based upon error-squared values of prediction error values that are obtained directly from the input video signal. Greater accuracy of evaluation would be obtained by using the video signal data of the dependent frames after all of the encoding processing (including transform processing, and quantization) has been executed. However this would require additional circuits for executing the inverse of such encoding, i.e. for the inverse transform processing etc., increasing the circuit scale substantially and making the apparatus more difficult to realize in practical form.

As stated above, the DC component of the current frame signal is subtracted from the current frame signal in the subtractor 39, to thereby prevent an excessively high output value being produced by the cumulative adder 31. However if not compensated for, this will tend to produce an excessively high probability that mode 4 will be selected by the minimum value selector circuit 32, i.e. the output from the cumulative adder 31 will tend to have too low a value. For that reason, a compensating offset value B is added to the output from the cumulative adder 31 in the adder 37.

On the other hand, in cases where there are only small differences between the respective values of prediction error that are being produced from the prediction signal subtractor 21, subtractor 20 and subtractor 22, it is preferable to prevent unnecessary switching between the modes 1, 2 and 3. For that reason, a slight amount of bias is given towards the selection of mode 1 (2-dimensional linear prediction) by the minimum value selector circuit 32. This is done by subtracting an offset value A from the output of the cumulative adder 29, in the subtractor 36. This has the advantage of increasing the rate of selection of mode 1, and so enabling a reduction in the amount of encoded data that are produced by encoding the prediction mode data from the minimum value selector circuit 32, if entropy encoding using for example the Huffman code is employed in the variable-length encoder section 8.

The decoding apparatus for decoding the encoded data that are transmitted from such an adaptive predictive encoded apparatus can be implemented very simply, by using the mode prediction data that are contained in the encoded output data. After the inverse of the variable-length encoding executed by the variable-length encoder section 8 has been performed, followed by dequantizing and inverse transform processing, each independent frame is transferred successively to a first and then a second frame memory for use in processing the dependent frames, corresponding to the memories 12 and 13 of FIG. 1, and are outputted without further processing. Each block of a dependent frame is processed depending upon the associated decoded prediction mode data for that block, as follows:

(1) If the prediction mode data indicates that the block has been encoded in mode 1, then the pixel data values of the corresponding blocks of the corresponding preceding and succeeding independent frame (read out from the aforementioned two frame memories) are respectively multiplied by the weighting values W and $(1-W)$, the results added, and the resultant value added to the current frame signal.

(2) If the prediction mode data indicates that the block has been encoded in mode 2, then the pixel data values of the corresponding blocks of the corresponding preceding independent frame are added to the current frame signal.

(3) If the prediction mode data indicates that the block has been encoded in mode 3, then the pixel data values of the corresponding blocks of the corresponding succeeding independent frame are added to the current frame signal.

(It will be apparent that a single circuit can be used to implement all of the functions (1), (2) and (3) above, by appropriately setting the weighting value W to either 1 or 0 for functions (2) and (3)).

(4) If the prediction mode data indicates that the block has been encoded in mode 4, then the fixed value (subtracted in the subtractor 23 of FIG. 2 of the encoder apparatus) is added to the current frame signal.

It will be apparent that the decoder apparatus for receiving an encoded output signal produced by an adaptaive predictive encoder apparatus according to the present invention can have a simple configuration, and can for example be implemented by slightly modifying an encoder apparatus that is described in the aforementioned related U.S. application by the assignee of the present invention.

What is claimed is:

1. An adaptive encoding apparatus for encoding an input video signal, said video signal comprising a sequence of frames each comprising successive pixel data the apparatus comprising:
    encoder means for encoding successive blocks of a frame of said video signal, each of said blocks comprising a fixed-size array of said pixel data values;
    means for selecting one in every N of said frames to be transferred directly to said encoder means as a reference frame, to be encoded by intra-frame encoding, where N is a fixed integer of value greater than one; and
    adaptive prediction means for executing adaptive prediction processing, as a dependent frame, of each frame occurring between a preceding one and a succeeding one of said reference frames in said frame sequence, by deriving for the data values of each block of a dependent frame respective prediction error values based upon an optimum prediction signal selected from a plurality of prediction signals derived using a plurality of combinations of said preceding and succeeding reference frames.

2. An adaptive predictive encoding apparatus according to claim 1, in which said adaptive prediction means comprises:
    means for deriving a first prediction signal based on a combination of pixel data of said preceding and succeeding reference frames, a second prediction signal derived only from said preceding reference frame, a third prediction signal derived only from said succeeding, and a non-prediction signal derived only from said dependent frame; and predictive mode selection means for selecting, for each of said blocks, one out of four prediction modes in which said first, second and third prediction signals and said non-prediction signal are respectively used in deriving predictive error values for respective pixel data of said block, to be sent to said encoder means and encoded thereby, said selection being based upon judgement of said errors, said predictive mode selection means further supplying to said encoding means, to be encoded thereby, predictive mode data indicating predictive modes which have been selected for respective ones of the blocks.

3. An adaptive predictive encoding apparatus according to claim 2, in which said adaptive prediction means further comprises means for varying, in accordance with respective time axis positions of said frames in said video signal, respective weighting values assigned to said preceding and succeeding reference frames for establishing said combination.

4. An adaptive predictive encoding apparatus according to claim 1, and further comprising decoding means for decoding said reference frames after encoding by said encoding means, and for supplying resultant decoded reference frames to said adaptive prediction means for use in producing said prediction signals.

5. An adaptive predictive encoding apparatus according to claim 1, and further comprising an (N−1) frame memory for temporarily storing each dependent frame of said video signal and outputting said each dependent frame to said adaptive prediction means after a fixed delay time, and first and second 1-frame memories for respectively holding pixel data of said preceding and succeeding reference frames and supplying pixel data of said preceding and succeeding reference frames to said adaptive prediction means during adaptive prediction processing of successive ones of said dependent frames.

* * * * *